(12) United States Patent
Poeschl

(10) Patent No.: US 12,397,955 B2
(45) Date of Patent: Aug. 26, 2025

(54) CONTAINER-HANDLING FACILITY AND REGULATING METHOD

(71) Applicant: KRONES AG, Neutraubling (DE)

(72) Inventor: Stefan Poeschl, Sinzing (DE)

(73) Assignee: KRONES AG, Neutraubling (DE)

( * ) Notice: Subject to any disclaimer, the term of this patent is extended or adjusted under 35 U.S.C. 154(b) by 875 days.

(21) Appl. No.: 17/255,402

(22) PCT Filed: Mar. 14, 2019

(86) PCT No.: PCT/EP2019/056394
§ 371 (c)(1),
(2) Date: Dec. 22, 2020

(87) PCT Pub. No.: WO2020/001818
PCT Pub. Date: Jan. 2, 2020

(65) Prior Publication Data
US 2021/0269187 A1 Sep. 2, 2021

(30) Foreign Application Priority Data

Jun. 29, 2018 (DE) .................. 10 2018 210 670.3

(51) Int. Cl.
*B65G 45/00* (2006.01)
*B65B 35/24* (2006.01)
*B65B 57/10* (2006.01)
*B65G 21/20* (2006.01)
*B65G 43/00* (2006.01)
(Continued)

(52) U.S. Cl.
CPC .............. *B65B 57/10* (2013.01); *B65B 35/24* (2013.01); *B65G 21/2072* (2013.01);
(Continued)

(58) Field of Classification Search
CPC ....... B65B 7/10; B65B 35/24; B65G 21/2072; B65G 43/00; B65G 47/52; B65G 45/00;
(Continued)

(56) References Cited

U.S. PATENT DOCUMENTS

2002/0000361 A1 1/2002 Reilly
2002/0179502 A1* 12/2002 Cerutti .................. B65G 43/08
209/583
(Continued)

FOREIGN PATENT DOCUMENTS

EP 3501676 A1 6/2019
JP 6446116 B1 12/2018
WO 2004080615 A2 9/2004

OTHER PUBLICATIONS

Cho, H. et al., "Artificial Neural Networks in Manufacturing Processes: Monitoring and Control," IFAC Proceedings Volumes, vol. 31, No. 15, Jun. 1998, 10 pages.
(Continued)

*Primary Examiner* — Kyle O Logan
(74) *Attorney, Agent, or Firm* — McCoy Russell LLP

(57) ABSTRACT

Container-handling facility for handling containers such as cans or bottles or the like in the beverage-processing industry, the container-handling facility compris at least one transport device for transporting the containers and a drone can be brought into the transport device, wherein the drone comprises an acceleration sensor for measuring an acceleration acting on the drone and a pressure sensor for measuring a pressure acting on the drone in the transport device, wherein the drone can transmit data corresponding to a measured acceleration and a measured pressure to a control unit, and wherein the control unit is ed to regulate at least one operating parameter influenc the acceleration of the drone and/or the pressure acting on the drone, ding o a comparison between the data received the drone and nominal values for the operating parameter and/or the acceleration and/or the pressure, stored in a memory.

14 Claims, 3 Drawing Sheets

(51) Int. Cl.
  *B65G 47/52* (2006.01)
  *G05B 13/02* (2006.01)
(52) U.S. Cl.
  CPC ............ *B65G 43/00* (2013.01); *B65G 47/52* (2013.01); *G05B 13/027* (2013.01); *B65G 45/00* (2013.01); *B65G 2203/0266* (2013.01); *B65G 2203/042* (2013.01); *B65G 2811/0673* (2013.01)
(58) Field of Classification Search
  CPC ...... B65G 2203/0266; B65G 2203/042; B65G 811/0673; G05B 13/027
  See application file for complete search history.

(56) References Cited

U.S. PATENT DOCUMENTS

| | | | | |
|---|---|---|---|---|
| 2005/0263443 | A1* | 12/2005 | Martin | G01N 21/90 209/522 |
| 2010/0276248 | A1* | 11/2010 | Gut | B65G 47/82 198/370.02 |
| 2011/0186406 | A1* | 8/2011 | Kraus | B65G 45/00 198/502.1 |
| 2016/0194157 | A1* | 7/2016 | Senn | B65G 37/02 414/467 |
| 2019/0022915 | A1* | 1/2019 | Zoelfl | B29C 49/783 |
| 2019/0127000 | A1* | 5/2019 | Eberl | B62D 65/022 |
| 2020/0039747 | A1* | 2/2020 | Ahmann | B65G 1/1375 |
| 2024/0149460 | A1* | 5/2024 | Matl | B25J 9/1661 |

OTHER PUBLICATIONS

Lingle, R., "Smart device measures production line pressure points on packages," Packaging Digest Website, Available Online at https://www.packagingdigest.com/shipping-containers/smart-device-measures-production-line-pressure-points-packages, Jan. 30, 2014, 6 pages.

ISA European Patent Office, International Search Report Issued in Application No. PCT/EP2019/056394, Jun. 27, 2019, WIPO, 6 pages.

* cited by examiner

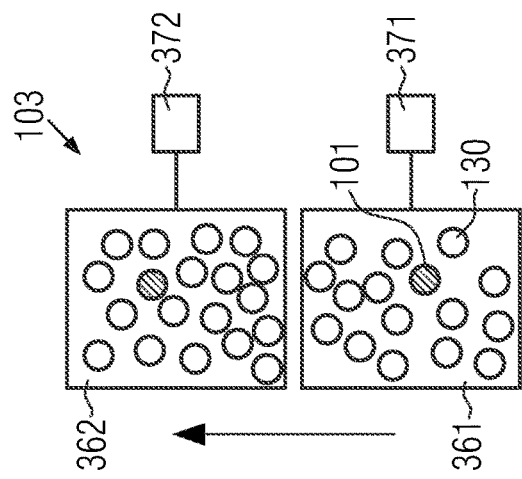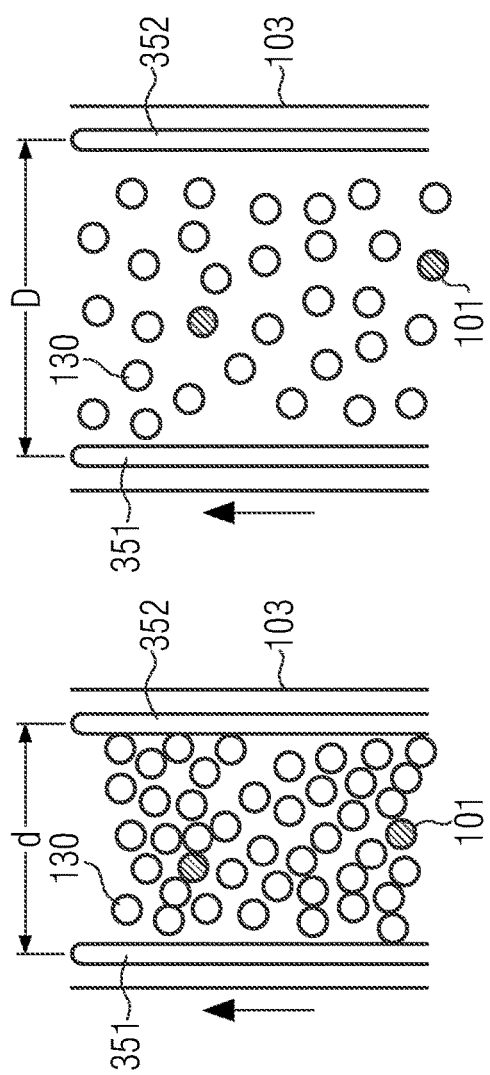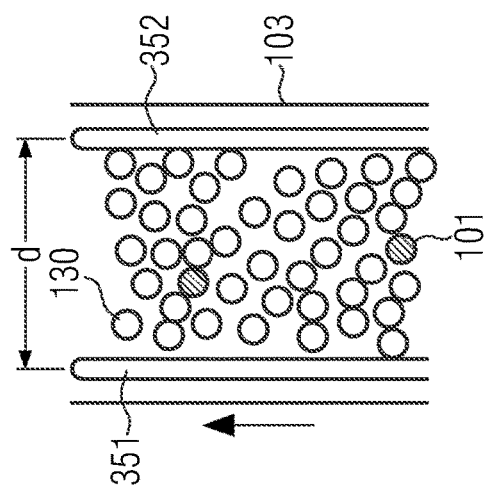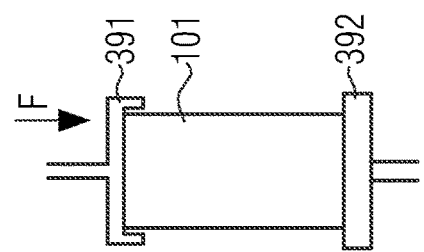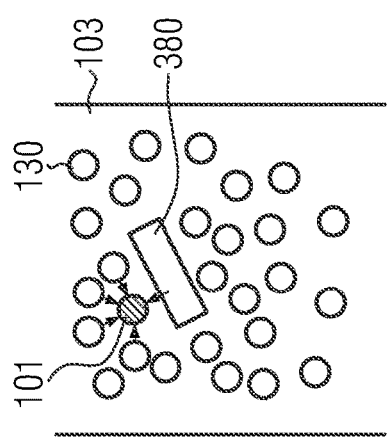

CONTAINER-HANDLING FACILITY AND REGULATING METHOD

CROSS REFERENCE TO RELATED APPLICATIONS

The present application is a U.S. National Phase of International Application No. PCT/EP2019/056394 entitled "CONTAINER-HANDLING FACILITY AND REGULATING METHOD," and filed on Mar. 14, 2019. International Application No. PCT/EP2019/056394 claims priority to German Patent Application No. 10 2018 210 670.3 filed on Jun. 29, 2018. The entire contents of each of the above-listed applications are hereby incorporated by reference for all purposes.

TECHNICAL FIELD

The present invention refers to a container-handling facility for handling containers, such as cans or bottles or the like of the beverage-processing industry, according to claim 1, as well as a regulating method for an operating parameter of a container-handling facility in the beverage-processing industry according to claim 8.

BACKGROUND AND SUMMARY

State of the Art

Container-handling facilities are sufficiently known from the state of the art in the beverage-processing industry. These container-handling facilities usually comprise one or a plurality of container-handling machines arranged one after the other in the transport direction of the containers and transport devices which transport the containers between the container-handling machines. Also transport devices that transport the containers within one of the container-handling machines are known. These include, for example, conveyors that transport containers in a mass flow, but also devices that are adapted to transport the containers individually or at least separately. These are, for example, stand plates with the corresponding centering devices or clamps that can grip and carry the containers, but also conveyor belts that only transport individual containers. Such transport devices also include transport stars, which have a series of gripping elements that rotate together around an axis of rotation and can pick up containers. In the case of containers in the form of glass bottles, mutual surface contact or contact with a part of the container-handling machine (a rail or other barrier, for example) can lead to rubbing, which is called "scuffing". PET bottles can also be scratched and crushed.

During the transport of the containers, many operating parameters that influence the movement of the containers cause different effects that can also have a negative impact on the containers. For example, if containers are transported in a mass flow, and if the number of containers added to the mass flow is too large, a container jam may occur. Especially when transporting cans, this can lead to crushing and thus to damage of individual cans.

Excessive clamping of the containers by centering devices and stand plates or by gripping elements in general can also lead to undesired damage.

Here, forces can act on the containers that cannot be detected directly or only with difficulty by commonly used sensors and control units. Such problems are often only detected at the end of container handling after passing a suitable inspection unit, which can result in a considerable amount of rejects. This also makes it more difficult to find the actual cause of container damage in the often very extensive container-handling facilities. This can lead to lengthy error analyses.

Object

Based on the known state of the art, the technical object to be solved is thus to provide a container-handling facility and a regulating method that ensures a targeted regulation of operating parameters depending on the forces acting on the containers, if possible in real time.

Solution

This object is solved according to invention by the container-handling facility according to claim 1 and the regulating method according to claim 8. Advantageous further developments of the invention are included in the subclaims.

The container-handling facility according to the invention for handling containers, such as cans or bottles or the like in the beverage-processing industry, comprises at least one transport device for transporting the containers and a drone which can be brought into the transport device, wherein the drone comprises an acceleration sensor for measuring an acceleration acting on the drone and a pressure sensor for measuring a pressure acting on the drone in the transport device, wherein the drone can transmit data corresponding to a measured acceleration and a measured pressure to a control unit and wherein the control unit is adapted to regulate at least one operating parameter which influences the acceleration of the drone and/or the pressure acting on the drone, depending on a comparison between the data received from the drone and nominal values for the operating parameter and/or the acceleration and/or the pressure stored in a memory.

The drone is to be understood here as an object that is transported in the transport device. It can therefore resemble in shape, size or composition the containers actually transported in the transport device. For example, if the containers are cans, the drone can have similar dimensions and also a similar weight or other physical characteristics as the cans. However, the invention is not limited to cans. Other containers, such as bottles made of glass or PET or the like, are also possible. Also in these cases, the drone can then preferably be adapted in shape and/or weight or other physical characteristics similar to the containers.

The data corresponding to a measured acceleration and pressure are not necessarily identical to the measured acceleration or pressure. Rather, the measured acceleration or additionally acquired data can be used to determine the position of the drone by processing the measured values obtained from the sensors and then transmitting these as data to the control unit. Alternatively, the acceleration or pressure can also be used to generate variables that can be derived from the measured acceleration or pressure, which are then transferred to the control unit as data. In any case, the data does not have to be identical to the measured values for acceleration and pressure, but usually represent values that correspond in some way to physical parameters of the drone or its movement or operating parameters.

According to the invention, the operating parameters regulated by the control unit are operating parameters which may actually have an influence on the acceleration and/or the pressure acting on the drone (or other physical parameters of the movement). These include, for example, the drive torques of the motors driving the transport device or the force with which gripping elements grip containers. This does not include operating parameters that have no influence on the acceleration or pressure acting on the drone and/or container, such as printed images applied in a printing machine or the composition of the product filled into the container.

The regulation of the operating parameter based on the comparison between the data received from the drone and the stored nominal values is to be understood here in the usual meaning of the term "regulation". This means that the control unit is capable of performing a conventional control loop in which the operating parameter is first set to an initial value and, depending on the corresponding data and the comparison of this data with the nominal value, a correction of the operating parameter is carried out if necessary, so that, for example, the measured acceleration corresponds to a nominal value of the acceleration. Then the drone again measures the acceleration and pressure and outputs the corresponding data. The control unit then carries out this comparison again to determine whether the regulation was successful and, if not, to readjust the operating parameter.

By using the drone, which measures the acceleration and the pressure acting on the drone, data and measurements can be obtained which correspond to or reflect the actual conditions for the containers within the transport device or within the container-handling facility. Thus the control unit can draw direct conclusions about the actual conditions within the transport device and the operating parameters or the operating parameters can be regulated in a targeted and effective way.

In one embodiment, the transport device is a transport device for transporting the containers in a disordered mass flow. Especially with such transport devices, it is difficult to make reliable statements about the forces acting on the individual containers in the transport device with the help of external sensors, i.e. sensors arranged outside the transport device. This is where the use of drones, which can be transported in the mass flow with the containers, for the regulation of the operating parameters particularly stands out.

Furthermore, it may be provided that the control unit can regulate a drive assigned to the transport device, depending on the comparison, and/or that the transport device is assigned a boundary area comprising two opposing side rails, wherein the containers are transported in the transport device between the side rails, and wherein the control unit is adapted to regulate the distance between the side rails depending on the comparison. By controlling the drive of the transport device, the acceleration acting on the containers and especially on the drone can be changed in the transport device.

Boundary rails are usually used in transport systems adapted for the disordered mass transport of containers and limit the width of the transport device and thus the possible throughput of containers at a given speed. By adjusting the side rails, on the one hand the throughput can be increased and on the other hand the pressure acting on the individual containers can be reduced, since, for example, with the same number of fed containers, more containers per time unit can pass the transport devices, so that the back pressure of the following containers is lower.

By this embodiment damage to the containers can be prevented.

Furthermore, it may be provided that the container-handling facility comprises an inward transfer device for inward transfer of a drone into the transport device and comprises an outward transfer device for outward transfer of the drone downstream of the inward transfer device, wherein the outward transfer device is connected to a detector which can detect the drone in the transport device and distinguish it from the other containers. Thus the transport of a plurality of drones can be realized by the transport device at the same time, whereby the drones are selectively discharged at suitable points, for example before entering a container-handling machine or before passing an inspection device. For this purpose, the outward transfer device can include grippers or pushers or other devices suitable for the individual discharge of containers. For example, the detector can detect a magnetic or optical mark on the drone and identify the drone on the basis of this mark. Based on the identification of a drone in the transport device by the detector, the outward transfer device can then be controlled to remove the drone from the transport device.

It may further be provided that the control unit comprises a neural network or that the control unit is assigned a neural network which is adapted to learn an optimization method for the regulation of the operating parameter based on a plurality of comparisons between the data received by the drone and the nominal values stored in the memory for the operating parameter and/or the acceleration and/or the pressure.

This learning of the optimization method can be based, for example, on the evaluation of the success rate of individual regulations. The success rate, or success in general, can be determined by the difference between a value for acceleration and/or pressure measured before a certain regulation process and a value for acceleration and/or pressure measured after the corresponding regulation. The greater the difference, or the greater the difference between the acceleration/pressure measured after regulation and the nominal value, the worse the success can be evaluated.

The neural network can then learn from high success values or success rates that the corresponding changes in the operating parameter prove to be particularly advantageous under given conditions of acceleration and/or pressure or other variables acting on the container and take this into account when optimizing the regulation of the operating parameters.

Thereby it is achieved to reduce the regulating cycles required to regulate the operating parameter and/or acceleration and/or pressure to the desired value.

Furthermore, it may be provided that the drone comprises a system for determining the position in the transport device and can transmit a current position of the drone together with the data to the control unit and wherein the control unit is adapted to regulate an operating parameter of a component of the container-handling facility which has an influence on the acceleration of the drone and/or the pressure acting on the drone in a current position of the drone in the transport device. The component can be, for example, a certain holder or a certain stand plate with the associated centering device or a motor that is assigned to a certain part of a transport device. As the position of the drone is also taken into account during regulation, the corresponding component can be readjusted in a targeted manner, so that superfluous control of operating parameters in other parts of the transport device and/or the container-handling facility can be omitted.

Furthermore, the control unit can be located inside or outside the drone.

If the control unit is located inside the drone, it may be a configuration in which only a processor, a suitable memory unit and a data transmission device are located inside the drone, which are adapted to drive certain components of the container-handling facility, for example in the immediate vicinity and to regulate them based on the measured data. In such an embodiment, the transmission of data corresponding to a measured acceleration and pressure to the control unit merely means that the values measured by the sensors are "transmitted" to the control unit in the drone, for example via cable connections. In this case, the transmission does not take place from the drone to a device located somehow outside the drone, but only by means of data transmission means inside the drone itself.

If the control unit is located outside the drone, the control unit can be, for example, the central control unit of the entire container-handling facility or only a control unit assigned to the special transport device. In this case, the transmission of the data according to the measured pressure and acceleration means, for example, a wireless transmission of the data by common means such as Bluetooth or W-LAN. Both embodiments can be used depending on the purpose, whereby the provision of the control unit within the drone allows a decentralized regulation of the operating parameters, so that the usually provided central control unit of the container-handling facility only controls and regulates the "rough" operation of the container-handling facility, whereas the specific and highly precise regulation of the operating parameters is performed by the individual control units of the drones. The use of a control unit outside the drone can reduce the acquisition costs of the container-handling facility and allows a central data processing and thus an easier access to the data by an operator, if necessary.

The regulation method according to the invention for an operating parameter of a container-handling facility in the beverage-processing industry, wherein the container-handling facility comprises at least one transport device for transporting the containers and a drone which can be brought into the transport device, wherein the drone comprises an acceleration sensor which measures an acceleration acting on the drone and comprises a pressure sensor which measures a pressure in the transport device acting on the drone, in that the drone transmits data corresponding to a measured acceleration and a measured pressure to a control unit, and the control unit regulates at least one operating parameter influencing the acceleration of the drone and/or the pressure acting on the drone, according to a comparison between the data received from the drone and nominal values for the operating parameter and/or the acceleration and/or the pressure stored in a memory. A time-saving and effective precise control of operating parameters is thus possible.

In one embodiment, the drone measures the acceleration and/or pressure continuously or at intervals of $10^{-3}$ s to $10^{-5}$ s and transmits the data to the control unit, wherein the control unit continuously or at intervals of $10^{-3}$ s to $10^{-5}$ s regulates the operating parameter. A permanently regulated operation of the container-handling facility can thus be realized.

It may further be provided that the control unit regulates a drive assigned to the transport device depending on the comparison, and/or a boundary rail is assigned to the transport device, which comprises two opposing side rails, wherein the containers are transported in the transport device between the side rails and wherein the control unit regulates the distance between the side rails depending on the comparison. A targeted influence of the transport parameters of the containers also in transport devices for the mass transport of the containers in a mass flow can be achieved in this way.

Furthermore, it may be provided that the control unit, depending on the comparison, detects that cleaning and/or lubrication of the transport device is necessary and outputs a corresponding signal to an operator and/or an automatic cleaning device or lubrication device for lubricating the transport device, which carries out cleaning and/or lubrication of the transport device based on the signal; and/or the control unit, depending on the comparison and/or the measured acceleration and/or the measured pressure, detects an error in the transport of the containers and outputs a corresponding signal to an operator and/or a control unit, such as a robot, which automatically corrects the error based on the signal. These errors include, for example, broken glass or container damage, or the unintentional exit of a container from the transport device. The resulting gap usually leads to a drop in the dynamic pressure of the containers in the mass flow, which can also affect the pressure acting on the drone. An abrupt drop in pressure, as occurs in the described incidents, can then be detected and the inspection unit can, for example, stand up the overturned container or remove the damaged container completely from the transport device. Also with this embodiment, a specific regulation of the transport of the containers through the container-handling facility is possible.

It may further be provided that the control unit comprises a neural network, or a neural network is assigned to the control unit, which, based on a multitude of comparisons between data received from the drone and nominal values for the operating parameter and/or the acceleration and/or the pressure stored in the memory, learns an optimization method for the regulation of the operating parameter and optimizes the regulation of the operating parameter using the optimization method. Thus the time required for the regulation of the operating parameter and/or the number of necessary regulating cycles can be advantageously reduced.

In one embodiment, the drone has the same external shape as the containers transported in the transport device. The measured accelerations and pressures acting on the drone therefore represent as accurately as possible the condition of the surrounding containers. Furthermore, the presence of the drone in this way does not affect the transport of the containers more than a container transported instead of the drone, so that the measured values are as realistic as possible.

Furthermore, the drone can be transported during normal operation in addition to the containers handled by the container-handling facility and together with these in the transport device. Hereby a control of the operating parameter during the ongoing operation, preferably in real time, becomes possible.

In a further embodiment, it is provided that the drone comprises a system for determining the position in the transport device, and the control unit regulates an operating parameter of a component of the container-handling facility which has an influence on the acceleration of the drone and/or the pressure acting on the drone in the current position of the drone in the transport device. With this embodiment, the targeted regulation of only those components of the container-handling facility can be effected which at a given time actually have an influence on the measured acceleration and/or the measured pressure acting on the drone. Superfluous regulations can thus be avoided.

SHORT DESCRIPTION OF THE FIGURES

FIGS. 3a to 3e show embodiments of regulated components and operating parameters;

DETAILED DESCRIPTION

Figure 1:
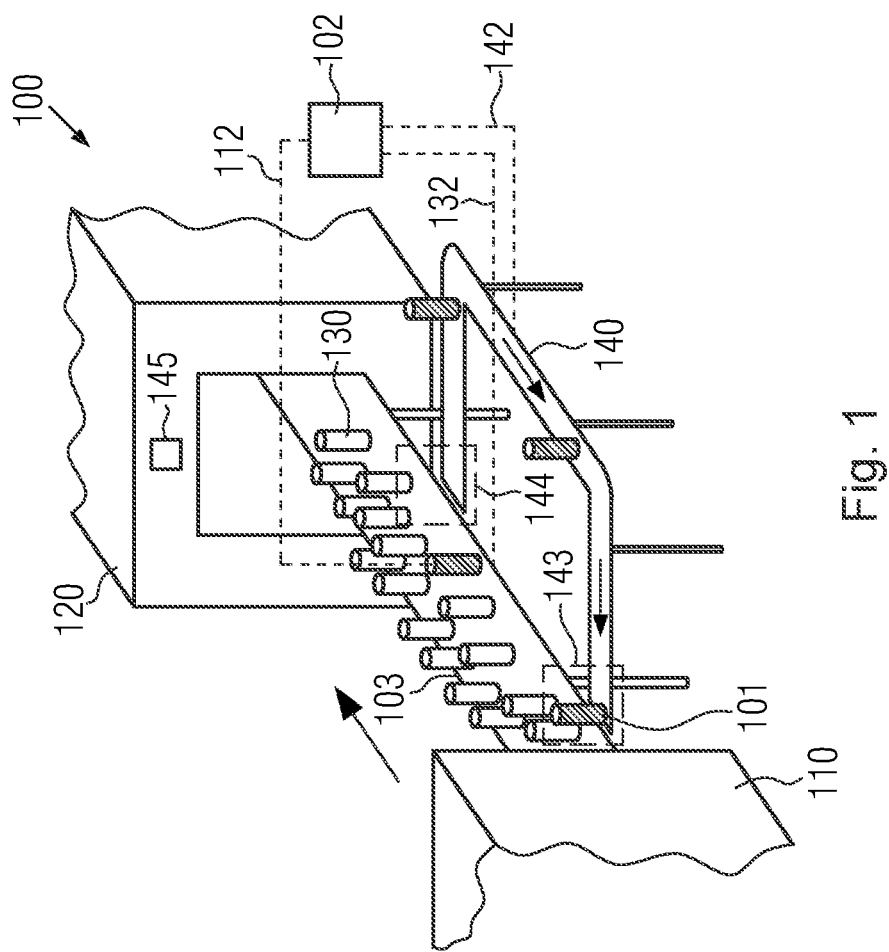
FIG. 1 shows a container-handling facility according to an embodiment.

FIG. 1 shows a container-handling facility 100 according to an embodiment of the invention. In the embodiment shown here, the container-handling facility comprises a first container-handling machine 110 and a second container-handling machine 120, which are connected to each other by a transport device 103, so that containers 130 can be transported from the first container-handling machine 110 in the transport direction of the transport device 103 into the second container-handling machine 120. The invention is not limited with respect to the transported containers. While reference is made to cans as a special design of the containers, all other containers are also considered, even those made of all conceivable materials, such as cans made of metal or plastic, cups made of metal, plastic or cardboard, bottles made of glass or plastic and the like.

The transport device 103 shown here is provided as a conveyor belt, which is adapted for the disordered transport of the containers 130 in a mass flow. For this purpose, the conveyor belt usually has a width that is considerably larger than the dimensions of the containers to be transported in the transport plane. For example, if the containers to be transported are cans for beverages, which usually have a diameter of a few centimeters up to 10 cm and a height of between 10 and 20 cm, the width of the transport section 103 can be one meter or more. This width of the transport section is only an example and is not to be understood as limiting. However, the width of the transport device 103 shown here differs from a transport device that is only adapted to transport the containers one behind the other, since in such a case the transport device usually has a width that either corresponds to the width or diameter of the containers to be transported in the transport device or is only slightly larger, so that in no case can two containers be transported next to each other.

According to the invention, the container-handling facility 100 comprises a control unit 102, which is adapted at least to control the operating parameters of the transport device 103. This includes, for example, the control of the drive or drives of the transport device in order to control the transport speed of the containers 130 in the transport device.

If the transport device is adapted as a transport device for individual transport of the containers, for example in the form of stand or rotary plates and centering devices cooperating with these for centering exactly one container on a stand plate, the control unit 102 is adapted to control at least the centering device and, if necessary, also the stand or rotary plate in such a way that the container is correctly clamped. This includes, for example, the control of the distance between stand plate and centering device depending on the size of the container, but also the contact pressure with which the centering device is pressed onto a container to be clamped.

For this purpose, the control unit 102 is connected by a data line 132 to the transport device 103 or to the components to be controlled (drives, centering device, stand plate or similar) and can control the operating parameters, such as the speed of the drive or the contact pressure of the centering device or the speed of the rotary plate or similar. The data line can include conventional LAN connections, but also wireless connections, such as W-LAN.

According to the invention, drones 101 are transported at least in the transport device 103 but possibly also by one of the container-handling machines 110 and 120 together with the remaining containers 130. According to the invention, these drones comprise an acceleration sensor which can measure an acceleration acting on the drone, for example in the transport device, and furthermore a pressure sensor which can measure the pressure acting on the drone in the transport device. In the following, pressure is to be understood as any form of force acting on the container itself, which is different from a directed force that is converted into a movement of the drone as a whole. This also includes, for example, the "contact pressure" of a centering device or the forces exerted on the drone 101 by other containers in the transport device 103. In a transport device that transports the containers 130 in the form of a mass flow, a drone experiences a pressure from the other containers in the form of the so-called "dynamic pressure", analogous to a container.

The drone is also adapted to generate data according to the measured acceleration and/or pressure. This includes, for example, transforming the acceleration/pressure measured by the sensors into a suitable signal which can then be transmitted to the control unit 102 via a data connection 112 (preferably Bluetooth connection or W-LAN connections).

Here, however, the data need not be identical with or corresponding to the measured acceleration and pressure. Rather, the drone can also process the measured acceleration or pressure before transmitting data to the control unit 112. For example, the force acting on the drone can be calculated from a measured acceleration and then transmitted to the control unit in the form of data. In addition, the drone can create a speed profile of its movement based on the acceleration measured over a certain period of time and transmit this speed profile to the control unit 102 instead of the acceleration. The same applies to the measured pressure. For example, the drone can combine measured values for the pressure acting on the drone from all sides into a pressure function that indicates the pressure as a function of the location on the surface of the drone to which this pressure is applied. This can be used to determine whether the pressure acts from above or below, for example, in a centering device and during the clamping of the drone between a stand plate and the centering device, or whether the dynamic pressure in a mass transport device is the same from all directions. Corresponding data can then be transmitted to the control unit 112.

According to the invention, the control unit 112 is adapted to regulate at least one operating parameter of the transport device or, more generally, an operating parameter which can influence the acceleration acting on the drone and/or the pressure acting on the drone, on the basis of the data of the drone. For this purpose, the control unit 102 can be assigned a memory device in which nominal values can be stored, for example for the operating parameter, but also for the acceleration and/or the pressure. After receiving the data from the drone, the control unit compares the acquired data with the nominal values. If there is a discrepancy (for example, a difference between measured acceleration and nominal value), the operating parameter or operating parameters can be controlled in such a way that, for example, the acceleration or pressure acting on the drone is adjusted to the nominal value. For example, the contact pressure of a centering device acting on the drone when it is positioned on the stand plate can be increased or decreased depending on whether the measured pressure is greater or less than the nominal value. In this case, the operating parameter to be controlled is the contact pressure exerted by the centering device on the container or the drone and thus, for example, the torque of a motor or drive connected to the centering device, which is controlled to generate the contact pressure.

Analogously, the speed profile of a transport device can be changed to adjust the acceleration acting on the drone to the nominal value for acceleration.

This is done in the form of a standard control loop. For this purpose, the drone 101 can be adapted to either continuously measure acceleration and/or pressure in order to transmit the corresponding data to the control unit, or the measurement of acceleration and pressure can also be carried out only at certain time intervals. For example, the drone can measure the acceleration and/or pressure in time intervals of $10^{-3}$ s to $10^{-5}$ s and transmit the corresponding data to the control unit 102. The control unit can then also regulate the operating parameter either continuously or according to the time intervals in which the control unit receives data from the drone.

FIG. 1 also shows the device 140, which realizes the outward and inward transfer of drones into the transport device 103. It is shown here only schematically as a conveyor belt that removes the drones from the transport device 103 before they enter the container-handling machine 120 and returns the containers 130 in the opposite direction in the transport device in order to feed the drones back into the transport device 103 behind the container-handling machine 110. The device 140 can be configured as a conveyor belt or other device and realize a buffering effect so that a large number of drones can be stored in this device 140. The dashed areas 143 and 144 schematically represent an inward transfer device 143 and an outward transfer device 144. The inward transfer device is suitable and adapted to bring a drone 101 into the transport device, preferably without allowing a container 130 from the transport device 103 to enter the inward transfer device and preferably without disturbing the transport of the containers in the transport device 103. The outward transfer device 144 is suitable for selectively removing drones from the transport device, but leaving the remaining containers 130 in the transport device. For this purpose, the outward transfer device can be adapted as a gripper or pusher, for example, which can remove a drone from the transport device. A detector 145, for example, which is arranged directly in front of the containers 130 before entering the container-handling machine 120, can be provided to clearly identify the drones 101 and in particular to distinguish them from the other containers. If the detector 145 detects a drone 101 in the transport device, it can control the outward transfer device 144 to remove the identified drone from the transport device 103 either by itself or by outputting a corresponding signal to the control unit 102.

The described inward transfer and outward transfer device 143 or 144 is not mandatory in this embodiment and can also be realized in other ways. In particular it is not necessary that the drone is only carried along in the transport device 103 between two container-handling machines 110 and 120 with the remaining containers. It can also pass through one or a plurality of container-handling machines together with the containers 130 and only then be removed from the flow of containers.

Figure 2:
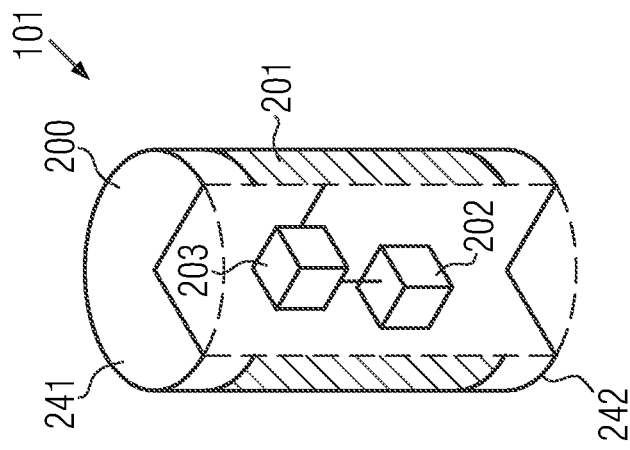
FIG. 2 shows an embodiment of the drone.

FIG. 2 shows a drone 101 according to an embodiment as already described with reference to FIG. 1. The drone comprises a drone body 200, which may have the outer shape of a can, for example. Depending on the containers generally present in the transport device or in the container-handling facility, the outer shape 200 of the drone can be adapted accordingly. If, for example, cans are processed with the container-handling facility, the external shape of the drone can correspond to that of these cans. It may also be provided that the drone 101 corresponds to the actual cans 130 not only with regard to the external shape but also with regard to other physical properties such as mass and coefficient of friction of the surface. However, this is not mandatory.

In the embodiment shown in FIG. 2, the drone includes an acceleration sensor 202 for measuring an acceleration acting on the drone 101. This acceleration sensor 202 can be adapted to measure accelerations in all three directions in space, but also to measure rotational speeds and associated torques acting on the drone 101. The acceleration sensor does not have to be adapted as a single sensor, but can also include several specialized acceleration sensors. These acceleration sensors can, for example, be formed by a first group of sensors that measure translational accelerations (upwards, downwards or in the transport direction or transversely to the transport direction) and a second group of acceleration sensors that measure torques acting on the drone 101. Basically, the acceleration sensors can be adapted in a known way. For example, they can be gyroscopes, magnetically stabilized masses and micro-electromechanical systems. All known acceleration sensors can be used here.

Furthermore the drone 101 includes a pressure sensor 201, which can measure pressures acting on the drone 101. The pressure sensor is here exemplarily adapted as a sensor which completely flows around the circumference of the drone 101. This sensor can therefore measure all forces (pressure) acting from the side on a standing drone in the transport device. Advantageously, the drone also includes a pressure sensor that can measure the contact pressure on the transport device (i.e. directed downwards) and a sensor that measures the pressure acting on the drone 101 from above. The terms "from above" and "downwards" of course only apply if the drone is transported in a standing position, so that there is actually a pressure acting "from above" or "from below". In general, the drone 101 may also be equipped with a pressure sensor on its base surface 242 or on its deck surface 241, or the pressure sensor 201 may also extend into this area. Here, too, all known sensors suitable for measuring the pressure acting on a surface of the drone 101 or the force acting on this surface can be used. In particular, sensors that can ensure the most accurate measurement possible with an accuracy of $+/-2 \times 10^{-3}$N over a force range of $10^{-3}$N to 10N are particularly suitable.

Furthermore, the drone 101 preferably comprises a processor unit 203. This processor unit can be formed by a processor, a memory unit and, if necessary, an additional transmitter for data transmission. The processor unit 203 can also be adapted as a control unit and be capable of performing the control function of the control unit 102 (see FIG. 1) either partially or completely at least for the transport device 103 and its drive. In any case, the processing unit 203 can convert the values measured by the acceleration and pressure sensors into corresponding data which can then be transmitted to a control unit 102. If it is intended that the processor unit 203 itself represents the control unit or performs the control functions as described, for example, with reference to FIG. 1, the "transmission" of the data is only to be understood as processing them internally within the drone.

The drone 101 can also include other sensors, especially temperature sensors and humidity sensors or similar, in order to measure, in addition to the accelerations and pressures acting on the drone, other parameters concerning the humidity in the area of a transport device or in the area of a container-handling machine or the temperature in these areas.

FIGS. 3a to 3e show embodiments regarding the control of components or operating parameters by the control unit as a function of the data received from the drone 101. In the following, it is only referred to the fact that the control unit sets the operating parameter by controlling, for example, the movement or other parameters of a component of the container-handling facility. It goes without saying that this is done in the form of the regulating cycle as described with reference to FIG. 1 and also executed with reference to FIG. 4. Furthermore, a comparison with a nominal value of the corresponding operating parameter, the acceleration or the pressure acting on the drone is always implicitly provided in order to guarantee a control at all. In this sense, FIGS. 3a to 3e only schematically illustrate how the properties of the container-handling facility can be changed by measuring the acceleration and pressure using the drone 101 in order to create the desired conditions for the containers 130.

FIG. 3a shows a mass conveyor 103, in which the containers 130 are transported together with the drones 101 in a mass flow. The width of the area of the transport device 103 in which the containers 130 are transported is defined by the distance d between two side rails 351 and 352, which together form a boundary rail. Together with the transport speed of the containers in the transport device 103, the width d defines the throughput of containers 130 that is achieved with the transport device. Due to the transport speed and the available width d, the containers 130 may accumulate, so that they exert an essentially equal back pressure on each other from all sides. This means that the drones 101 (shown in black in FIG. 3a) experience a pressure from all sides which can be measured by the pressure sensor. If this pressure exceeds a certain limit or nominal value, for example 0.05N per square centimeter, the control unit (see for example FIG. 1) can control the distance of the side rails 351 and 352 so that the newly set distance D is greater than the distance d. In this case, the distance d or D is to be considered as an operating parameter which, even if only indirectly, influences the pressure experienced by a container. This ensures that the throughput is increased by the transport device while the transport speed of the container remains constant. This also reduces the back pressure acting on the containers. The same applies, of course, if the back pressure is too low or the back pressure is identical to 0. In this case, the individual containers practically do not touch each other in the transport device and there is a risk that the containers might tip over. In this case, the control unit can reduce the distance between the side rails 351 and 352 in order to reduce the attainable throughput and thus increase the back pressure while maintaining the transport speed.

As an alternative to or in addition to changing the distance of the side rails 351 and 352, the control unit can also be adapted to increase or decrease the transport speed of the containers in the transport device, for example by controlling the drive of the transport device.

FIG. 3c shows a more special embodiment where the containers 130 together with the drones are transported along the arrow shown on two conveyor belts 361 and 362. The conveyor belts are each driven by individual drives 371 and 372. Such conveyor belts are usually used to distance containers 130 when the downstream conveyor belt 362 moves faster than the conveyor belt 361. Similarly, the distance between the containers can be reduced when the conveyor belt 362 moves slower (correspondingly slower speed) than the first conveyor belt 361.

Due to the different transport speeds, an acceleration acts on the containers when passing from the first to the second conveyor belt. This can be measured by the acceleration sensors of the drone. Depending on the measured values, the speed difference between the conveyor belts 361 and 362, for example, can then be set by the control unit 102 in such a way that the accelerations acting on the containers do not fall below a certain minimum value and do not exceed a certain maximum value, for example, in order to prevent the unintentional accumulation of containers and at the same time to prevent containers from accidentally falling over. The control unit can be adapted to control either only one of the 371 or 372 drives in order to control its operating parameters (drive speed, torque or similar) depending on the data received from the drone 101 or the control unit 102 can control both drives 371 and 372.

FIG. 3d shows another case in which the containers 130 are transported together with the drones 101 in a mass conveyor 103. During this transport, a container may tip over, for example due to insufficient back pressure. Furthermore, a bottle transported in the mass transporter can also be damaged or destroyed due to too high back pressure. Both can lead to an abrupt change in the dynamic pressure, so that the dynamic pressure acting on the drone 101 with the arrows shown is no longer even, or the pressure acting on the drone 101 changes abruptly. In this case, the control unit can recognize from the data received from the drone 101 that there is a problem in the transport device.

It can then, for example, output a signal to an operator that there is a problem such as an overturned or damaged container, or the control unit can control an inspection unit that corrects this error (overturned or damaged container or similar) by, for example, removing the overturned container 380 from the transport device 103. For this purpose, in addition to the drones 101, one or a plurality of optical sensors can be assigned to the transport device, which can detect an overturned or damaged container 380. Common image recognition methods can be used here. If the data from the drone 101 indicates that a container must have turned over or has been damaged, these optical sensors can be used to locate this container and take appropriate measures, such as controlling a robot arm that removes the overturned container or the damaged container 380 from the transport device 103.

FIG. 3e shows an embodiment where a container or in this case the drone 101 is positioned on a stand plate 392 and fixed by a centering device 391 by the force acting on the drone 101 from above, so that the position of the drone is fixed relative to the stand plate 392 and the centering device 391. The stand plate 392 can also be a rotary table that can be rotated together with the centering device so that the container is rotated along the corresponding axis of rotation. On the one hand, it can be provided that the drone 101 measures the acceleration (torque) acting on it during rotation and transmits the corresponding data to the control unit, which can then determine whether the achieved rotational speed or the acting torques require regulation and, for example, whether they need to be increased or reduced. Additionally or alternatively, the drone can measure the contact pressure F (corresponding to a contact pressure) applied to it by the centering device 391 and transmit the corresponding data to the control unit. Depending on these data, the control unit can then determine whether the force F is too great or too small and regulate an operating parameter of the centering device accordingly. For example, the control unit can increase or decrease a torque of a drive of the centering device that ultimately causes the contact pressure F.

Figure 4:
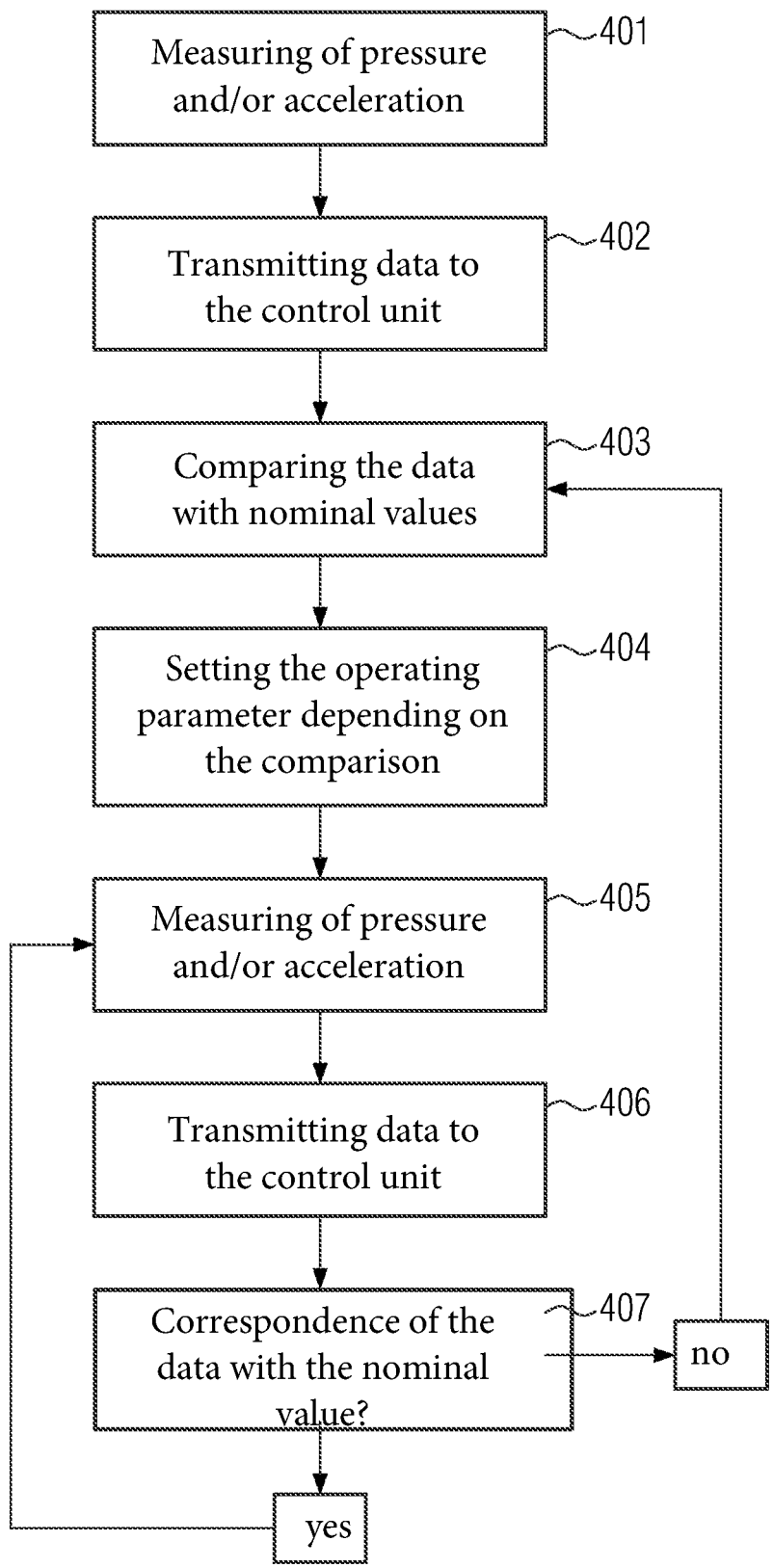
FIG. 4 shows a flow diagram of a regulating method according to an embodiment.

FIG. 4 is a flow diagram of a regulating method according to the invention for an operating parameter of a container-handling facility as described with reference to FIGS. 1 to 3. The regulating method described in FIG. 4 can be applied in any of the previously described embodiments, since it can be applied to any conceivable operating parameter and its regulation based on data received from the drone.

The steps 401 and 402 of the method to be described in the following are usually only carried out during the first execution, i.e. during the first measurement of pressure and/or acceleration with the drone. The actual regulating process, which is performed by the control unit described above, is described in steps 403 to 407. The method of FIG. 4 can therefore be shortened by steps 401 and 402 during progressive operation, so that essentially only the regulating cycle is performed in steps 403 to 407.

The method in FIG. 4 begins with step 401, during which the drone according to one of the preceding embodiments, determines the pressure and/or acceleration acting on it in one of the ways described above. This may include, for example, that the drone measures the force/pressure acting on it by a centering device and a stand plate, or that the drone measures the force/pressure acting on it from all sides through the remaining containers in a transport device for mass transport, as described with transport device 103 in FIG. 1. From this, the drone generates data corresponding to the acceleration and/or pressure, whereby, as already explained, these data need not be identical to the measured pressure and the measured acceleration, but also concern other characteristic parameters, such as a measured force, a measured speed profile depending on the time and the position of the drone or similar.

The data is then transferred to the control unit in step 402. This transmission is usually wireless in the form of a Bluetooth connection or a W-LAN connection for data exchange. While this data connection only has to be formed in such a way that the drone can transmit the data to the control unit, i.e. a unidirectional connection from the drone to the control unit is sufficient, this data connection can also be formed bi-directionally so that the control unit of the drone can also transmit data.

In step 403, the received data is compared in the control unit with nominal values for an operating parameter and/or the acceleration and/or the pressure acting on the drone stored in a memory of the control unit or in a memory otherwise assigned to the control unit. This comparison can essentially consist of a difference between the nominal value and the values contained in the data. For example, a nominal value for the accelerations acting on the drone can be stored in the memory for transport section 103 according to FIG. 1 or, in particular, for the adjacent transport sections 361 and 362 according to FIG. 3c. The measured acceleration, which actually acts on the drone, can then be compared with the stored value so that the measured value is subtracted from the nominal value. If the difference is smaller than zero, the measured acceleration is greater than the nominal value. If the difference is greater than zero, it is smaller than the nominal value. The same applies, of course, to all other operating parameters and values contained in the data transmitted to the control unit by the drone, such as the force acting on the drone, the torque acting on the drone, the pressure acting on the drone, and the like. All directly measured variables, but also variables derived from the directly measured variables, can be compared with nominal values.

In step 403 it is assumed that the comparison of measured value (also known as actual value) with the nominal value leads to a difference different from zero, i.e. that the actual value differs from the nominal value in some way.

Therefore, in the next step 404 the control unit will set the operating parameter relevant for the corresponding measured value according to the comparison, i.e. it will control the corresponding component of the container-handling facility and change its operation. In the case of FIGS. 3a and 3b, for example, the drone can measure a pressure exerted on it that is greater than a specified nominal value. This would be the case which was described with reference to FIG. 3a. The control unit will then move the side rails 351 and 352 to a distance from each other that is greater than the original distance so that the pressure acting on the drone is reduced.

In the next step 405, the pressure or the acceleration acting on the drone is measured again by the drone and in step 406 the corresponding data (see description of step 402) is transmitted to the control unit.

In an intermediate step 407, which is implicitly also included in step 403, it is determined whether the data correspond to a nominal value, i.e. whether, for example, the setting of the operating parameter in step 404 has resulted in a pressure acting on the drone corresponding to the nominal value.

If this is the case, the system returns from step 407 to step 405 and the pressure and/or acceleration on the drone is measured again and transmitted to the control unit according to step 406.

If, on the other hand, it is detected in step 407 that the data do not correspond to the nominal values, the system returns to step 403, where a comparison (i.e. a difference formation) is performed and, depending on this comparison or the difference, the operating parameter is then set in step 404 depending on the comparison.

The procedure then continues again with steps 405 to 407, and it is checked again whether the data match the nominal values.

It goes without saying that steps 403 and 407 can also be combined, since when a difference is made between the measured value and the nominal value, it can always be detected whether the measured value "matches" the nominal value. In this combined variant, where step 407 contains not only the determination of a match but additionally the creation of the comparison according to step 403, the procedure is then continued directly at step 404, i.e. the setting of the operating parameter depending on the comparison.

When determining the comparison between the measured data and the nominal values, it may be provided that a match between nominal value and measured data is assumed if the difference between measured data and nominal value does not exceed a certain limit according to amount. This means that both for cases where the difference between the nominal value minus the actual value is less than zero, and for cases where the difference between the nominal value and the actual value is greater than zero, for example where the actual value deviates from the nominal value by two percent, a match between the nominal value and the actual value is still assumed, so that control of the operating parameter is then not necessary and the next measurement cycle of the drone is awaited according to step 405.

The procedures described in the method according to FIG. 4, especially steps 403 to 407, can be performed at different frequencies. For example, the drone can be adapted to continuously measure the acceleration or pressure acting on it. It is also conceivable to have embodiments in which this measurement takes place at certain time intervals, for example 105s, so that several thousand measurements are made per second. Since the containers usually move through the container-handling machines at high speed, this frequency of measurements is quite reasonable. It may also be provided that some measurements, such as the acceleration acting on the drone, are made at a different frequency than the measurement of the pressure acting on the drone.

It may also be provided that the measurement of acceleration or pressure or the control/regulation of an operating parameter is dependent on the current position of the drone. For this purpose, the drone can include a system for position determination in addition to the corresponding sensors, which enables the determination of the position of the drone in the transport device, but also in the entire container-handling facility, for example also in one of the container-handling machines. Depending on this position, the control unit can be enabled to control specific components of the container-handling facility in order to change operating parameters. For example, according to FIG. 3c, only one of the drives 371 or 372 can be controlled either in the transport device 361 or in the transport device 362 depending on the position of the drone. In the same way, according to FIG. 3e, the contact pressure of the centering device 91 can be controlled specifically for the container in which the drone is currently located.

The detection of the position or the information about the position of the drone in the container-handling facility can also be used to perform or not perform the measurement of the acceleration or the measurement of the pressure. For example, if the drone is located in a transport device for mass transport according to FIGS. 3a and 3b or according to FIG. 1, measuring the pressure acting on the drone may be essential, whereas the acceleration acting on the drone is negligible. The drone can then either measure the pressure independently based on its determined position and refrain from measuring the acceleration or the control unit instructs the drone via the bi-directional data link to measure the pressure and refrain from measuring the acceleration. Other embodiments are also conceivable in which the acceleration of the drone or the forces acting on the drone (see for example FIG. 3e) are relevant, but measurement of the pressure is superfluous.

The method in FIG. 4 or all the procedures described so far for regulating the operating parameters can be optimized with the aid of a neural network. For this purpose the control unit itself can comprise such a neural network, or it can be assigned to the control unit and executed in an additional server, for example.

The neural network is adapted in such a way that it receives the results of the comparisons (e.g. from step 403) and/or the corresponding data of the drone and/or the nominal values and additionally the adjustment of the operating parameters based on the comparison. By means of the comparison between the adjusted operating parameters, the result of the comparison of the corresponding data with the nominal values and the values for acceleration and pressure measured after the adjustment of the operating parameters or variables derived from them, the neural network can learn whether the adjustment of the operating parameter, based on the data received first, has led to success compared to the nominal values (i.e. whether, for example, the difference between data and nominal values has been reduced), or whether the opposite was the case. Based on this, the neural network can learn which setting of which operating parameter in which cases (especially which differences between data and nominal values) lead to an actual improvement of the condition, i.e. a reduction of the difference between data and nominal values. This optimization can then be incorporated into the method according to FIG. 4 to optimize the regulation of the operating parameters.

The invention claimed is:

1. Container-handling facility for handling containers, such as cans or bottles or the like in a beverage processing industry, wherein the container-handling facility comprises at least one transport device for transporting the containers and a drone which can be brought into the transport device, wherein the container-handling facility comprises a control unit adapted to regulate at least one operating parameter and a memory device assigned to the control unit and adapted to store nominal values for the at least one operating parameter, wherein the drone comprises an acceleration sensor for measuring an acceleration acting on the drone and a pressure sensor for measuring a pressure acting on the drone in the transport device, wherein the drone is adapted to transmit data corresponding to a measured acceleration and a measured pressure to the control unit, and wherein the control unit is adapted to regulate at least one operating parameter which influences the acceleration of the drone and/or the pressure acting on the drone, depending on a comparison between the data received from the drone and nominal values for the operating parameter and/or the acceleration and/or the pressure stored in the memory device,
    wherein the container-handling facility further comprises an inward transfer device for inward transfer of a drone into the transport device and, downstream of the inward transfer device, an outward transfer device for outward transfer of the drone, the outward transfer device being connected to a detector which can detect the drone in the transport device and distinguish it from other containers.

2. The container-handling facility according to claim 1, wherein the transport device is a transport device for transporting the containers in a disordered mass flow.

3. The container-handling facility according to claim 1, wherein the control unit can regulate a drive assigned to the transport device, depending on the comparison; and/or
    wherein the transport device is assigned a boundary rail comprising two opposing side rails, wherein the containers are transported in the transport device between the side rails, and wherein the control unit is adapted to regulate distance between the side rails depending on the comparison.

4. The container-handling facility according to claim 1, wherein the control unit comprises a neural network or a neural network is assigned to the control unit, which is adapted to learn an optimization method for the control of the operating parameter based on a plurality of comparisons between data received from the drone and nominal values stored in the memory device for the operating parameter and/or the acceleration and/or the pressure.

5. The container-handling facility according to claim 1, wherein the drone comprises a system for determining a position in the transport device and can transmit a current position of the drone together with the data to the control unit, and wherein the control unit is adapted to regulate an operating parameter of a component of the container-handling facility which has an influence on the acceleration of the drone and/or the pressure acting on the drone in a current position of the drone in the transport device.

6. The container-handling facility according to claim 1, wherein the control unit is arranged in the drone or outside the drone.

7. A control method for controlling an operating parameter of a container-handling facility in the beverage processing industry, wherein the container-handling facility comprises at least one transport device for transporting the containers and a drone which can be brought into the transport device, wherein the container-handling facility comprises a control unit adapted to regulate at least one operating parameter and a memory device assigned to the control unit and adapted to store nominal values for the at least one operating parameter, wherein the drone comprises an acceleration sensor which measures an acceleration acting on the drone and a pressure sensor which measures a pressure in the transport device acting on the drone, and wherein the control method comprises:

transmitting data via the drone corresponding to a measured acceleration and a measured pressure to the control unit; and regulating, via the control unit, at least one operating parameter which influences the acceleration of the drone and/or the pressure acting on the drone, depending on a comparison between the data received from the drone and nominal values for the operating parameter and/or the acceleration and/or the pressure stored in the memory device, wherein the container-handling facility further comprises an inward transfer device for inward transfer of a drone into the transport device and, downstream of the inward transfer device, an outward transfer device for outward transfer of the drone, the outward transfer device being connected to a detector which can detect the drone in the transport device and distinguish it from other containers.

8. The control method according to claim 7, wherein the drone measures the acceleration and/or the pressure continuously or at time intervals of $10^{-3}$ s to $10^{-5}$ s and transmits the data to the control unit, and wherein the control unit controls the operating parameter continuously or at time intervals of $10^{-3}$ s to $10^{-5}$ s.

9. The control method according to claim 7, wherein the control unit controls a drive assigned to the transport device depending on the comparison; and/or wherein the transport device is assigned to a boundary rail comprising two opposing side rails, wherein the containers are transported in the transport device between the side rails, and wherein the control unit regulates distance between the side rails depending on the comparison.

10. The control method according to claim 7, wherein the control unit determines, depending on the comparison, that cleaning and/or lubrication of the transport device is necessary and outputs a corresponding signal to an operator and/or an automatic cleaning device and/or a lubrication device for lubricating the transport device, which performs cleaning and/or lubrication of the transport device based on the signal; and/or wherein the control unit detects an error in the transport of the containers depending on the comparison and/or the measured acceleration and/or the measured pressure, and outputs a corresponding signal to an operator and/or a control unit, such as a robot, which corrects the error automatically based on the signal.

11. The control method according to claim 7, wherein the control unit comprises a neural network or a neural network is assigned to the control unit, which, based on a plurality of comparisons between data received from the drone and nominal values for the operating parameter and/or the acceleration and/or the pressure stored in the memory device, learns an optimization method for a regulation of the operating parameter and optimizes the regulation of the operating parameter using the optimization method.

12. The control method according to claim 7, wherein the drone has the same outer shape as the containers transported in the transport device.

13. The control method according to claim 7, wherein the drone is transported in normal operation in addition to the containers handled by the container-handling facility and together with these in the transport device.

14. The control method according to claim 7, wherein the drone comprises a system for determining the position in the transport device, and wherein the control unit regulates an operating parameter of a component of the container-handling facility which has an influence on the acceleration of the drone and/or the pressure acting on the drone in a current position of the drone in the transport device.

* * * * *